(12) United States Patent
Kishi et al.

(10) Patent No.: US 7,883,797 B2
(45) Date of Patent: Feb. 8, 2011

(54) NON-AQUEOUS ELECTROLYTE BATTERY

(75) Inventors: Takashi Kishi, Kanagawa (JP); Takashi Kuboki, Tokyo (JP); Hidesato Saruwatari, Kanagawa (JP); Norio Takami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 808 days.

(21) Appl. No.: 11/179,585

(22) Filed: Jul. 13, 2005

(65) Prior Publication Data

US 2006/0068282 A1 Mar. 30, 2006

(30) Foreign Application Priority Data

Sep. 24, 2004 (JP) ............................. 2004-278280

(51) Int. Cl.
*H01M 4/58* (2010.01)

(52) U.S. Cl. ............ 429/231.1; 429/231.3; 429/231.95; 429/231.5; 429/232; 429/224; 429/322; 429/101; 429/103; 429/223

(58) Field of Classification Search .............. 429/231.1, 429/231.3, 231.95, 231.5, 232, 223, 224, 429/322, 101, 103
See application file for complete search history.

(56) References Cited

U.S. PATENT DOCUMENTS

| 5,436,092 | A * | 7/1995 | Ohtsuka et al. | .......... 429/218.1 |
| 5,545,468 | A | 8/1996 | Koshiba et al. | |
| 6,274,271 | B1 | 8/2001 | Koshiba et al. | |
| 7,029,793 | B2 * | 4/2006 | Nakagawa et al. | ....... 429/231.1 |

| 2005/0064282 | A1 | 3/2005 | Inagaki et al. | |
| 2005/0164082 | A1 | 7/2005 | Kishi et al. | |
| 2005/0221188 | A1 * | 10/2005 | Takami et al. | ............ 429/231.1 |
| 2007/0254213 | A1 * | 11/2007 | Best et al. | ................... 429/210 |

FOREIGN PATENT DOCUMENTS

| CN | 1428012 | 7/2003 |
| JP | 6-275263 | 9/1994 |
| JP | 10-69922 | 3/1998 |
| JP | 11-86905 | 3/1999 |
| JP | 2000-106217 | 4/2000 |
| JP | 2001-23688 | 1/2001 |
| JP | 2002-110225 | 4/2002 |
| JP | 2002-110230 | 4/2002 |
| JP | 2004-134165 | 4/2004 |
| JP | 2007-273154 | 10/2007 |
| KR | 97-4129 | 1/1997 |
| WO | WO 01/86748 | * 11/2001 |

OTHER PUBLICATIONS

U.S. Appl. No. 11/464,396, filed Aug. 14, 2006, Kishi, et al.
U.S. Appl. No. 11/492,106, filed Jul. 25, 2006, Kishi, et al.
U.S. Appl. No. 11/683,605, filed Mar. 8, 2007, Kishi, et al.
U.S. Appl. No. 12/047,857, filed Mar. 13, 2008, Ishii, et al.
U.S. Appl. No. 12/033,304, filed Feb. 19, 2008, Kishi, et al.

* cited by examiner

*Primary Examiner*—Laura S Weiner
(74) *Attorney, Agent, or Firm*—Oblon, Spivak, McClelland, Maier & Neustadt, L.L.P.

(57) ABSTRACT

A non-aqueous electrolyte battery that contains a molten salt electrolyte and has the enhanced output performances and cycle performances can be provided. The electrolyte has a molar ratio of lithium salt to molten salt of from 0.3 to 0.5, and the non-aqueous electrolyte battery has a positive electrode having a discharge capacity of 1.05 or more times that of a negative electrode thereof.

8 Claims, 4 Drawing Sheets

NON-AQUEOUS ELECTROLYTE BATTERY

The present application claims foreign priority based on Japanese Patent Application No. JP2004-278280 filed on Sep. 24 of 2004, the contents of which is incorporated herein by reference.

BACKGROUND OF THE INVENTION

The present invention relates to a non-aqueous electrolyte battery.

In recent years, the market of portable data apparatus such as cellular phone, small-sized personal computer and portable audio equipment has been rapidly growing. These portable apparatus comprise a non-aqueous electrolyte secondary battery having a high energy density. The enhancement of the performance of the non-aqueous electrolyte secondary battery is still under study. These portable apparatus are produced on the supposition that they are carried by men. Therefore, these portable apparatus must exhibit their performance and assure safety in various atmospheres.

This type of a non-aqueous electrolyte secondary battery comprises a lithium-containing cobalt composite oxide or lithium-containing nickel composite oxide as a positive electrode material, a graphite-based or coke-based carbon material as a negative active material and a solution of a lithium salt such as $LiPF_6$ and $LiBF_4$ in an organic solvent as an electrolyte. The positive electrode and the negative electrode each are in the form of sheet. The two electrodes have the electrolyte retained therein. The positive and negative electrodes are disposed opposed to each other with an electrically insulating separator provided interposed therebetween. The laminate is received in a vessel having various shapes to form a battery.

In some unforeseen electrical uses such as overcharge, the aforementioned non-aqueous electrolyte secondary batteries undergo chemical reaction different from those occurring in usual charge-discharge process and become thermally unstable. In this case, it is likely that the electrolyte mainly containing a combustible organic solvent can be combusted to impair the safety of the batteries. Further, when the ambient temperature rises, the resulting vaporization of the inner electrolyte causes the rise of the inner pressure, making it likely that the rupture of the exterior material and concurrent ignition of the electrolyte can occur when the ambient temperature is too high. Moreover, when external impact, deformation or damage is given to the battery to cause the electrolyte to leak out, it is likely that the electrolyte can catch fire and combust because it is an inflammable liquid.

In order to solve these problems, the change of formulation of electrolyte has been studied. The related art organic solvent-based electrolytes have heretofore comprised ethylene carbonate, diethyl carbonate, ethyl methyl carbonate, γ-butyrolactone or the like as a solvent. The flash point of ethylene carbonate, diethyl carbonate, ethyl methyl carbonate and γ-butyrolactone are 152° C., 31° C., 24° C. and 98° C., respectively. In an attempt to enhance the safety of batteries, only ethylene carbonate or γ-butyrolactone, which has a relatively high flash point among these solvents, has been used. However, since it has been reported that the temperature of the interior of passenger cars is sometimes more than 100° C. in summer, these solvents are not sufficient. Further, when batteries comprising such a solvent are used at 60° C. or more, it is likely that the life of the batteries can be shortened or the battery vessel can be destroyed by the generation of gas in the batteries. In addition, the electrolyte is still combustible even if these solvents are used and thus can be combusted when it catches fire.

In an attempt to drastically enhance the safety of batteries, the use of room temperature molten salts having no flash point as electrolyte has been studied. However, molten salts have a high viscosity and hence a low ionic conductivity that gives extremely low output performance. These molten salts are also disadvantageous in that they can be difficultly impregnated into the positive and negative electrodes and the separator.

In order to solve these problems, the incorporation of a non-aqueous solvent which has been heretofore used, such as diethyl carbonate and ethylene carbonate in the molten salt has been studied. However, although the molten salt is incombustible or fire retardant, the incorporation of the combustible organic solvent is disadvantageous in that the safety, which is one of great advantages attained by the use of the molten salt, can be impaired.

Among various molten salts, molten salts containing tetrafluoroborate anion (abbreviated as "$BF_4^-$") or bis(trifluoromethanesulfonyl)amide anion (abbreviated as "TFSI") having a relative low viscosity leave something to be desired in cycle performances or retention of performances in a high temperature atmosphere such as 60° C. and exhibit drastically deteriorated output performances as compared with non-aqueous electrolyte batteries comprising organic solvents such as carbonate-based solvent which have been already put to practical use. Further, molten salts having a higher content of fluoroalkyl group such as bis(pentafluoroethanesulfonyl) amide anion (abbreviated as "BETI") have a higher viscosity that causes a drastic deterioration of output performance or other performances. Moreover, JP-A-2002-110225 proposes that a lithium salt should be incorporated in a molten salt in an amount as small as from 0.2 to 1.0 mol/L to keep the ionic conductivity as high as possible. However, the incorporation of the lithium salt causes the viscosity of the molten salt to rise more than that of the molten salt itself and the ionic conductivity of the electrolyte to fall, making the drastic deterioration of output performances and cycle performances unavoidable.

The related art non-aqueous electrolyte batteries cannot be expected to exhibit enhanced output performances and cycle performances because the electrolyte containing the room temperature molten salt used has a high viscosity and thus can permeate the separator too difficultly to make effective use thereof.

SUMMARY OF THE INVENTION

According to an illustrative, non-limiting aspect of the invention, there is provided a non-aqueous electrolyte battery which includes: a negative electrodel a positive electrode having a discharge capacity of 1.05 or more times that of the negative electrode; and an electrolyte comprising a lithium salt and a molten salt, the electrolyte having a molar ratio of the lithium salt to the molten salt of from 0.3 to 0.5.

The invention can provide a non-aqueous electrolyte battery having high output performances and excellent cycle performances.

DETAILED DESCRIPTION OF THE INVENTION

Figure 1:
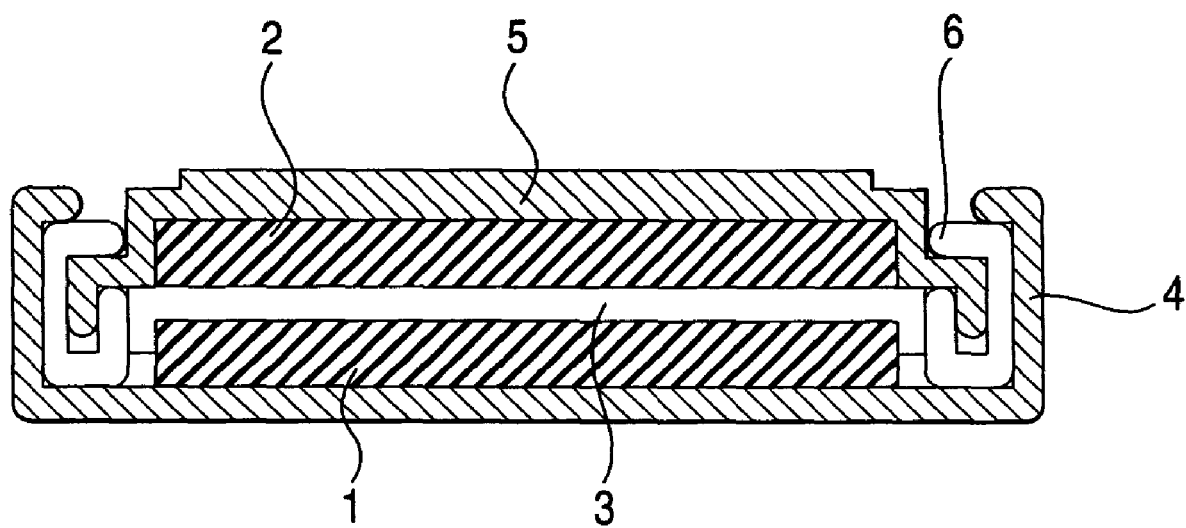
FIG. 1 is a sectional view illustrating an example of a coin-shaped non-aqueous electrolyte secondary battery according to an illustrative, non-limiting embodiment of the invention.

An exemplary embodiment of a non-aqueous electrolyte battery of the invention will be described hereinafter.

The aforementioned positive electrode includes a lithium composite oxide containing at least one of cobalt, manganese and nickel incorporated therein as a positive active material and is capable of insertion/releasing lithium ion. Various oxides such as chalcogen compound, e.g., lithium-containing cobalt composite oxide, lithium-containing nickel-cobalt composite oxide, lithium-containing nickel composite oxide and lithium-manganese composite oxide may be used as positive active material. Among these oxides, lithium-containing cobalt composite oxide, lithium-containing nickel-cobalt composite oxide and lithium-containing manganese composite oxide having a charge-discharge potential of 3.8 V or more with respect to the lithium metal working potential can realize a high battery capacity and thus are desirable. Further, a positive active material represented by $LiCO_xNi_yMn_zO_2$ ($x+y+z=1$, $0<x\leq0.5$, $0<y<1$, $0\leq z<1$) is particularly desirable because it can inhibit the decomposition reaction of molten salt on the surface of the positive electrode at room temperature or higher.

The aforementioned negative electrode is capable of containing lithium (or lithium ion) or capable of occluding/releasing lithium (or lithium ion) similarly to the aforementioned positive electrode. The negative electrode includes a negative active material incorporated therein capable of containing lithium ion or insertion/releasing lithium ion at a more negative potential than that of the positive electrode combined with the negative electrode. Examples of negative active materials having such characteristics include: lithium metal; carbonaceous materials (carbon-based materials) such as artificial graphite, natural graphite, non-graphitizable carbon and graphitizable carbon; lithium titanate; iron sulfide; cobalt oxide; lithium-aluminum alloy; and tinoxide. Further, active materials having a negative working potential of nobler than 0.5 V with respect to the lithium metal working potential are desirable. The selection of these active materials makes it possible to inhibit the deterioration of the molten salt by side reaction on the surface of the negative active material. In this respect, lithium titanate and iron sulfide are most desirable as negative active material. Furthermore, lithium titanate having a spinel crystal structure in view of the negative working potential of the negative electrode. Two or more negative active materials may be used in admixture.

The aforementioned electrolyte includes a molten salt and a lithium salt. The molar ratio of lithium salt to molten salt is from 0.3 to 0.5. The lithium battery electrolyte is required to have a high lithium ionic conductivity and so low viscosity as to give a high infiltration into the electrode or separator. It was found that in order to increase the number of lithium ions produced by the dissociation of lithium salt and minimize the viscosity of the entire electrolyte, the molar ratio of lithium salt to molten salt is important e.g., from 0.3 to 0.5 as calculated in terms of the aforementioned molar ratio of lithium salt to molten salt. The use of an electrolyte having a molar ratio falling within the above defined range makes it possible to enhance the output performances of the battery. Although the detailed mechanism is unknown, when the molar ratio falls within this range, the electrolyte shows a higher viscosity and a lower ionic conductivity (Here, The ionic conductivity is a conductivity of all ions including lithium ion and molten salt other than the lithium ion) than that shown when the molar ratio is 0.3 or less but exhibits high output performances when applied to battery. It is thus thought that the number of lithium ions and mobility of these electrolytes make a great contribution to the actual battery reaction. More preferably, the aforementioned molar ratio ranges from 0.35 to 0.4 to provide high output performances even at a temperature as low as 0° C.

When various lithium salts and various molten salts each are incorporated in an amount of from 0.2 to 1.0 mol/L as reported in the related art techniques, the resulting electrolyte has a molar ratio of 0.03 to 0.2 as defined above. For example, when 0.5 M of $LiBF_4$ is dissolved in $EMI.BF_4$ as reported in JP-A-2002-110225, the resulting electrolyte has a molar ratio of 0.08 as defined above.

The aforementioned positive electrode and negative electrode each preferably includes a carbonaceous material (or a carbon-based material) incorporated therein as a conductive material. The incorporation of a carbonaceous material having a DBP oil absorption (JIS K 6217-4:2001, ISO 4656-1: 1992) of 180 ml/0.1 kg or more as a conducting material makes it possible to obtain a high percent utilization of active material. In particular, a carbonaceous material having a DBP oil absorption of 200 ml/0.1 kg or more is more preferably used to obtain higher cycle performances. This is presumably because the capability of retaining electrolyte in the electrode is enhanced.

The discharge capacity of the aforementioned positive electrode is 1.05 or more times that of the aforementioned negative electrode. The combination of the constitution of the discharge capacity of the aforementioned positive and negative electrodes with the molar ratio of the aforementioned electrolyte makes it possible to enhance the cycle performances in addition to the enhancement of the output performances. This is presumably because the aforementioned constitution of the discharge capacity of the positive and negative electrodes causes the charge-discharge reaction in secondary battery to be governed by the change of potential of the negative electrode, making the load on the electrode and the electrolyte in contact with the electrode heavier on the negative electrode side. In particular, in the case where as the positive electrode there is used an active material having a potential of from 3.9 to 4.3 V (vs. lithium metal) such as $LiCO_xNi_yMn_zO_2$ ($x+y+z=1$, $0<x\leq0.5$, $0<y<1$, $0\leq z<1$), as the negative electrode there is used an active material having a potential of from 1.0 to 1.7 V (vs. lithium metal) such as lithium titanate and the aforementioned electrolyte is an imidazolium-based electrolyte, the effect of enhancing the cycle performances is great. The discharge capacity of the aforementioned positive electrode is preferably 1.10 or less times that of the aforementioned negative electrode to prevent the extreme drop of the capacity of the entire battery and the potential of the negative electrode. In particular, the discharge capacity of the aforementioned positive electrode is more preferably from 1.05 to 1.07 times that of the aforementioned negative electrode to prevent the deterioration of the positive active material at a temperature as high as 60° C. or more.

Even when the battery is a primary battery, the aforementioned constitution of the discharge capacity of the positive and negative electrodes makes it possible to prevent the generation of gas caused by side reaction on the positive electrode side.

The cation contained in the aforementioned molten salt is not specifically limited but may be one or more selected from the group consisting of aromatic quaternary ammonium ions such as 1-ethyl-3-methyl imidazolium, 1-methyl-3-propylimidazolium, 1-methyl-3-isopropylimidazolium, 1-butyl-3-methylimidazolium, 1-ethyl-2,3-dimethyl imidazolium, 1-ethyl-3,4-dimethylimidazolium, N-propylpyridinium, N-butylpyridinium, N-tert-butyl pyridinium and N-tert-pentylpyridinium, and aliphatic quaternary ammonium ions such as N-butyl-N,N,N-trimethylammonium, N-ethyl-N,N-dimethyl-N-propyl ammonium, N-butyl-N-ethyl-N,N-dimethylammonium, N-butyl-N,N-dimethyl-N-propylammonium, N-methyl-N-propylpyrrolidinium, N-butyl-N-methyl pyrrolidinium, N-methyl-N-pentylpyrrolidinium, N-propoxyethyl-N-methylpyrrolidinium, N-methyl-N-propyl piperidinium, N-methyl-N-isopropylpiperidinium, N-butyl-N-methylpiperidinium, N-isobutyl-N-methyl piperidinium, N-sec-butyl-N-methyl piperidinium, N-methoxyethyl-N-methylpiperidinium and N-ethoxyethyl-N-methylpiperidinium. Among these aliphatic quaternary ammonium ions, pyrrolidinium ions as nitrogen-containing 5-membered ring or piperidinium ions as nitrogen-containing 6-membered ring are desirable because they have a high reduction resistance that inhibits side reaction to enhance storage properties or cycle performances.

Further, among the aromatic quaternary ammonium ions, cations having an imidazolium structure are more preferably used because they can provide a molten salt having a low viscosity which gives high battery output performances when used as an electrolyte. Further, the use of an active material having a working potential of nobler than 0.5 V with respect to the lithium metal potential as a negative active material makes it possible to inhibit side reaction even with a molten salt containing a cation having the aforementioned imidazolium on the negative electrode and obtain a non-aqueous electrolyte secondary battery excellent in storage properties and cycle performances.

The anion contained in the aforementioned molten salt is not specifically limited but may be one or more selected from the group consisting of $PF_6^-$, $(PF_3(C_2F_5)_3)^-$, $(PF_3(CF_3)_3)^-$, $BF_4^-$, $(BF_2(CF_3)_2)^-$, $(BF_2(C_2F_5)_2)^-$, $(BF_3(CF_3))^-$, $(BF_3(C_2F_5))^-$, $(B(COOCOO)_2)^-$ (abbreviated as "BOB$^-$"), $CF_3SO_3^-$ (abbreviated as "Tf$^-$"), $C_4F_9SO_3^-$ (abbreviated as "Nf$^-$"), $((CF_3SO_2)_2N)^-$ (abbreviated as "TFSI$^-$"), $((C_2F_5SO_2)_2N)^-$ (abbreviated as "BETI$^-$"), $((CF_3SO_2)(C_4F_9SO_2)N)^-$, $((CN)_2N)^-$ (abbreviated as "DCA$^-$") and $((CF_3SO_2)_3C)^-$ and $((CN)_3C)^-$. Among these there may Be desirably used at least one of $PF_6^-$, $(PF_3(C_2F_5)_3)^-$, $(PF_3(CF_3)_3)^-$, $BF_4^-$, $(BF_2(CF_3)_2)^-$, $(BF_2(C_2F_5)_2)^-$, $(BF_3(CF_3))^-$, $(BF_3(C_2F_5))^-$, Tf$^-$, Nf$^-$, TFSI$^-$, BETI$^-$ and $((CF_3SO_2)(C_4F_9SO_2)N)$, which include F, in view of excellent cycle performances.

As the aforementioned lithium salt there may be used one or more selected from the group consisting of lithium tetrafluoroborate (abbreviated as "LiBF$_4$"), lithium hexafluorophosphate (abbreviated as "LiPF$_6$"), lithium hexafluoromethanesulfonate, lithium bis(trifluoromethane sulfonyl) amide (abbreviated as "LiTFSI"), lithium dicyanamide (abbreviated as "LiDCA"), lithium trifluoromethanesulfonate (abbreviated as "LiTFS") and lithium bis(pentafluoroethanesulonyl)amide (abbreviated as "LiBETI").

The aforementioned electrolyte includes one or more of the aforementioned molten salts and one or more of the aforementioned lithium salts. In order to obtain as high fire retardancy as possible, it is desirable that no organic solvents other than described above be incorporated in the electrolyte. However, in order to enhance the effect of inhibiting side reaction in the battery or the affinity of the electrolyte for the separator or the like, other organic solvents may be incorporated in the electrolyte. The added amount of other organic solvents is preferably 5% by weight or less to retain fire retardancy. Further, in the case where other organic solvents are incorporated to inhibit side chemical reaction such as side reaction in the battery, the added amount of these organic solvents is preferably such that not smaller than the half the added amount is consumed after the battery assembly or the termination of initial charge-discharge, i.e., 3% by weight or less.

The aforementioned electrolyte may includes carbon dioxide incorporated therein. Carbon dioxide is an inert gas and thus can inhibit side reaction on the surface of the negative electrode without impairing the fire retardancy of the electrolyte to exert an effect of inhibiting the rise of internal impedance or an effect of enhancing cycle performances.

The positive electrode and the negative electrode are separated from each other by a separator and are electrically connected to each other by ion movement through the aforementioned electrolyte supported on the separator. In order to form a battery including an electrolyte having the aforementioned constitution, a porous sheet or nonwoven cloth having a porosity (caluculated from apparent volume and specific gravity) of 70% or more and including a polyolefin or polyester can be used as the aforementioned separator. In this arrangement, the rate at which the electrolyte is impregnated in the separator can be raised to obtain higher output performances. This is presumably because the viscosity of the electrolyte having the aforementioned constitution is high. In particular, a nonwoven cloth of polypropylene, which is one of polyolefins, or polyethylene terephthalate, which is one of polyesters, is preferably used to obtain high output performances as well as better cycle performances. This is presumably because such a material exhibits a good affinity for molten salt and a good retention of molten salt.

An exemplary embodiment of a non-aqueous electrolyte battery of the invention will be further described in detail in connection with FIG. 1.

The aforementioned non-aqueous electrolyte secondary battery includes a positive electrode 1, a separator 3 and a negative electrode 2 stacked in this order, which are received in coin-shaped battery vessels 4, 5, and further includes a non-aqueous electrolyte received in the battery vessels 4, 5. The upper portion 5 and the lower portion 4 of the battery vessel are connected to each other with an electrically insulating gasket 6 provided interposed therebetween to make sealing. The separator 3 and the clearance in the positive electrode 1 and the negative electrode 2 are impregnated with a non-aqueous electrolyte.

The aforementioned positive electrode 1 contains a positive active material incorporated therein and may further contain an electrically conductive material such as carbon or a binder for helping sheet or pelletize the positive active material. The positive electrode 1 can be used in contact with an electronically conductive substrate such as metal as a collector.

As the aforementioned binder there may be used a polytetrafluoroethylene (PTFE), a polyvinylidene fluoride (PVdF), an ethylene-propylene-diene copolymer, a styrene-butadiene rubber or the like.

As the aforementioned collector there may be used a foil, thin sheet, mesh or gauze of metal such as aluminum, stainless steel and titanium.

The aforementioned positive active material and the aforementioned conductive material may be pelletized or sheeted with the aforementioned binder by kneading/rolling. Alternatively, these materials may be dissolved and suspended in a solvent such as toluene and N-methylpyrrolidone (NMP) to form slurry which is then spread over the aforementioned collector and dried to form a sheet.

The aforementioned negative electrode 2 comprises a negative active material incorporated therein. The negative electrode 2 is obtained by pelletizing, tabulating or sheeting the negative active material with a conductive material, a binder, etc.

As the conductive material there may be used an electronically conducting material such as carbon and metal. The auxiliary conducting agent is preferably in the form of powder, fibrous powder or the like.

As the aforementioned binder there may be used a polytetrafluoroethylene, polyvinylidene fluoride, styrene-butadiene rubber, carboxymethyl cellulose or the like. As the aforementioned collector there may be used a foil, thin plate, mesh or gauze of copper, stainless steel, nickel or the like.

The aforementioned negative active material and the aforementioned conductive material may be pelletized or sheeted with the aforementioned binder by kneading/rolling. Alternatively, these materials may be dissolved and suspended in a solvent such as water and N-methylpyrrolidone to form slurry which is then spread over the aforementioned collector and dried to obtain a sheet.

As the aforementioned separator 3 there may be used a nonwoven cloth of synthetic resin, a porous polyethylene film, a porous polypropylene film, a porous cellulose sheet or the like.

As the aforementioned battery vessels 4 and 5 there are each used a coin-shaped vessel made of stainless steel, iron or the like. The upper portion 5 and the lower portion 4 of the vessel are crimped with a gasket 6 provided interposed therebetween to make sealing. Alternatively, a vessel having various shapes such as cycle and prism or a laminated film bag may be used.

As the aforementioned gasket there may be used a polypropylene, polyethylene, vinyl chloride, polycarbonate, Teflon (R) or the like.

FIG. 1 illustrates an example using a coin-shaped vessel. The lower surface of the vessel acts as a positive electrode terminal and the upper surface of the vessel acts as a negative electrode terminal. The shape of the non-aqueous electrolyte battery is not limited to the coin-shape, and examples of the shape of the non-aqueous electrolyte battery include coin-shape, cylindrical shape and rectangular shape.

EXAMPLE

The invention will be further described in the following examples in connection with the attached drawings. In the following examples, the battery configuration shown in FIG. 1 is employed.

Example 1

90% by weight of a lithium cobalt oxide ($Li_2CoO_2$) powder, 2% by weight of a carbonaceous material, as a conducive material, obtained by calcining a carbon black in the argon atmosphere at 1,400° C. (DBP oil absorption: 200 ml/0.1 kg) for 48 hours, 3% byweight of graphite as a conducive material and 5% byweight of a polyvinylidene fluoride as a binder were mixed with N-methylpyrrolidone as a solvent with stirring to form a slurry which was then spread over an aluminum foil having a thickness of 20 μm and dried and pressed. The positive electrode sheet thus obtained was then cut into a circle having a diameter of 15 mm to prepare a positive electrode 1. The content of an active material in the positive electrode 1 was 7.91 mg.

90% by weight of $Li_{4/3}Ti_{5/3}O_4$ powder as a negative active material, 5% by weight of an artificial graphite as a conducive material and 5% by weight of a polyvinylidene fluoride were mixed with an N-methylpyrrolidone solution to obtain a slurry which was then spread over an aluminum foil having a thickness of 20 μm and dried and pressed. The negative electrode sheet thus obtained was then cut into a circle having a diameter of 16 mm to prepare a negative electrode 2. The content of an active material in the negative electrode 2 was 6.30 mg.

The ratio of discharge capacity of positive electrode to negative electrode was 1.050.

As the separator 3 there was used a nonwoven cloth of polypropylene having a porosity of 90%.

An electrolyte having 1.8 mol/L of lithium tetrafluoroborate ($LiBF_4$) dissolved in 1-ethyl-3-methyl imidazolium tetrafluoroborate ($EMI•BF_4$) was prepared. The molar ratio of lithium salt to molten salt was 0.31.

The aforementioned positive electrode 1, the aforementioned separator 3 and the aforementioned negative electrode 2 were stacked on a coin-shaped battery vessel (lower portion) 4 in this order. The stacked product was then vacuum-impregnated with the aforementioned non-aqueous electrolyte. Thereafter, a coin-shaped battery vessel (upper portion) 5 was put on the stacked product with a gasket 6 provided interposed therebetween. The upper portion 4 and the lower portion 5 were crimped for sealing to prepare a coin-shaped non-aqueous electrolyte secondary battery.

Example 2

Since-the content of active material in the positive electrode and the negative electrode were 7.91 mg and 6.29 mg, respectively, the ratio of discharge capacity of positive electrode to negative electrode was 1.052. An electrolyte having 2.0 mol/L of lithium tetrafluoroborate ($LiBF_4$) dissolved in 1-ethyl-3-methyl imidazolium tetrafluoroborate ($EMI\ BF_4$) was prepared. The molar ratio of lithium salt to molten salt was 0.34. A non-aqueous electrolyte secondary battery was prepared in the same manner as in Example 1 except for the aforementioned conditions.

Example 3

Since the content of active material in the positive electrode and the negative electrode were 7.92 mg and 6.30 mg, respectively, the ratio of discharge capacity of positive electrode to negative electrode was 1.051. An electrolyte having 2.5 mol/L of lithium tetrafluoroborate ($LiBF_4$) dissolved in 1-ethyl-3-methyl imidazolium tetrafluoroborate ($EMI\ BF_4$) was prepared. The molar ratio of lithium salt to molten salt was 0.44. A non-aqueous electrolyte secondary battery was prepared in the same manner as in Example 1 except for the aforementioned conditions.

Example 4

Since the content of active material in the positive electrode and the negative electrode were 8.13 mg and 6.29 mg, respectively, the ratio of discharge capacity of positive electrode to negative electrode was 1081. An electrolyte having 2.0 mol/L of lithium tetrafluoroborate ($LiBF_4$) dissolved in 1-ethyl-3-methyl imidazolium tetrafluoroborate ($EMI•BF_4$) was prepared. The molar ratio of lithium salt to molten salt was 0.34. A non-aqueous electrolyte secondary battery was prepared in the same manner as in Example 1 except for the aforementioned conditions.

Example 5

Since the content of active material in the positive electrode and the negative electrode were 7.90 mg and 6.29 mg, respectively, the ratio of discharge capacity of positive electrode to negative electrode was 1.050. As a separator there was used a nonwoven cloth of polyethylene terephthalate having a porosity of 92%. A non-aqueous electrolyte secondary battery was prepared in the same manner as in Example 1 except for the aforementioned conditions.

Example 6

Since the content of active material in the positive electrode and the negative electrode were 8.68 mg and 6.30 mg, respectively, the ratio of discharge capacity of positive electrode to negative electrode was 1.152. A non-aqueous electrolyte secondary battery was prepared in the same manner as in Example 2 except for the aforementioned conditions.

Example 7

Since the content of active material in the positive electrode and the negative electrode were 7.90 mg and 6.29 mg, respectively, the ratio of discharge capacity of positive electrode to negative electrode was 1.050. The auxiliary conducting agent incorporated in the positive electrode was DENKABLACK (DBP oil absorption: 165 ml/0.1 kg). A non-aqueous electrolyte secondary battery was prepared in the same manner as in Example 1 except for the aforementioned conditions.

Comparative Example 1

Since the content of active material in the positive electrode and the negative electrode were 7.92 mg and 6.31 mg, respectively, the ratio of discharge capacity of positive electrode to negative electrode was 1.050. An electrolyte having 0.5 mol/L of lithium tetrafluoroborate ($LiBF_4$) dissolved in 1-ethyl-3-methyl imidazolium tetrafluoroborate ($EMI•BF_4$) was prepared. The molar ratio of lithium salt to molten salt was 0.08. A non-aqueous electrolyte secondary battery was prepared in the same manner as in Example 1 except for the aforementioned conditions.

Comparative Example 2

Since the content of active material in the positive electrode and the negative electrode were 7.91 mg and 6.29 mg, respectively, the ratio of discharge capacity of positive electrode to negative electrode was 1.052. An electrolyte having 3.0 mol/L of lithium tetrafluoroborate ($LiBF_4$) dissolved in 1-ethyl-3-methyl imidazolium tetrafluoroborate ($EMI•BF_4$) was prepared. The molar ratio of lithium salt to molten salt was 0.55. A non-aqueous electrolyte secondary battery was prepared in the same manner as in Example 1 except for the aforementioned conditions.

Comparative Example 3

Since the content of active material in the positive electrode and the negative electrode were 7.17 mg and 6.31 mg, respectively, the ratio of discharge capacity of positive electrode to negative electrode was 0.950. A non-aqueous electrolyte secondary battery was prepared in the same manner as in Example 2 except for the aforementioned conditions.

Figure 2:
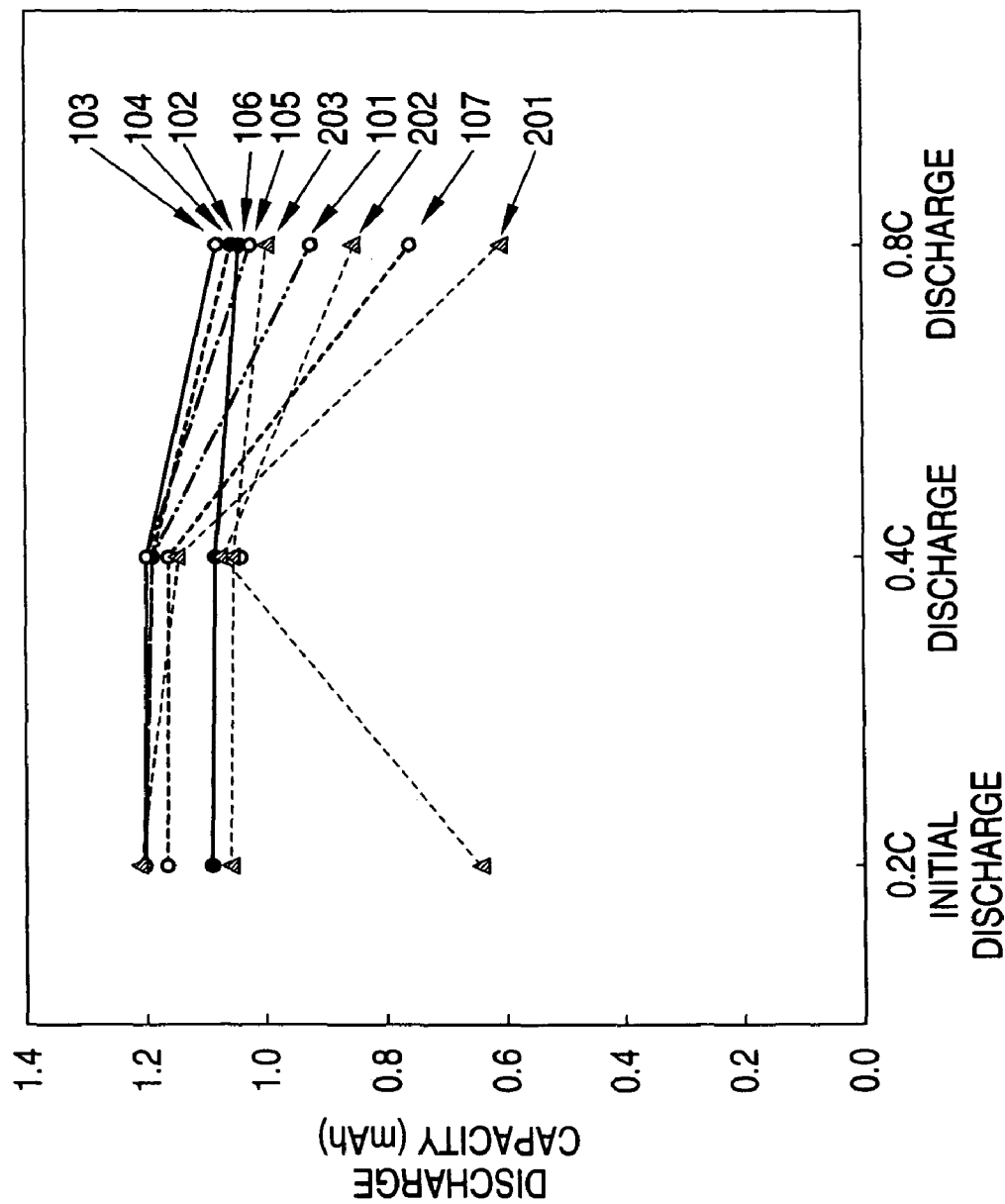
FIG. 2 is a diagram illustrating the output performances of inventive examples and comparative examples.

The non-aqueous electrolyte secondary batteries of Examples 1 to 7 and Comparative Examples 1 to 3 thus obtained were each charged with a constant current of 0.25 mA to 2.8 V. After reaching 2.8V, these batteries were each then charged at a constant voltage of 2.8V for 8 hours in total. Thereafter, these batteries were discharged to 1.5 V with a constant current of 0.25 mA. Thereafter, these batteries were charged under the same conditions as mentioned above, and then discharged to 1.5 V with 0.5 mA and 1.0 mA. These batteries were each then measured for discharge capacity. The discharge capacity thus determined are shown in FIG. 2. Lines 101 to 107 in FIG. 2 represent discharge capacities of Examples 1 to 7, respectively, and Lines 201 to 203 in FIG. 2 represent discharge capacities of Comparative Examples 1 to 3, respectively.

As an anion contained in the molten salt of the electrolyte, bis(trifluoromethane sulfonyl) amide anion may be used as described below.

Example 8

Since the content of active material in the positive electrode and the negative electrode were 7.93 mg and 6.31 mg, respectively, the ratio of discharge capacity of positive electrode to negative electrode was 1.051. An electrolyte having 1.0 mol/L of lithium bis(trifluoromethanesulfonyl)amide (LiTFSI) dissolved in 1-ethyl-3-methylimidazolium bis(trifluoromethanesulfonyl)amide (EMITFSI) was prepared. The molar ratio of lithium salt to molten salt was 0.30. A non-aqueous electrolyte secondary battery was prepared in the same manner as in Example 1 except for the aforementioned conditions.

Comparative Example 4

Since the content of active material in the positive electrode and the negative electrode were 7.91 mg and 6.29 mg, respectively, the ratio of discharge capacity of positive electrode to negative electrode was 1.052. An electrolyte having 0.5 mol/L of lithium bis(trifluoromethanesulfonyl)amide (LiTFSI) dissolved in 1-ethyl-3-methylimidazolium bis(trifluoromethane sulfonyl)amide (EMI•TFSI) was prepared. The molar ratio of lithium salt to molten salt was 0.14. A non-aqueous electrolyte secondary battery was prepared in the same manner as in Example 1 except for the aforementioned conditions.

Figure 3:
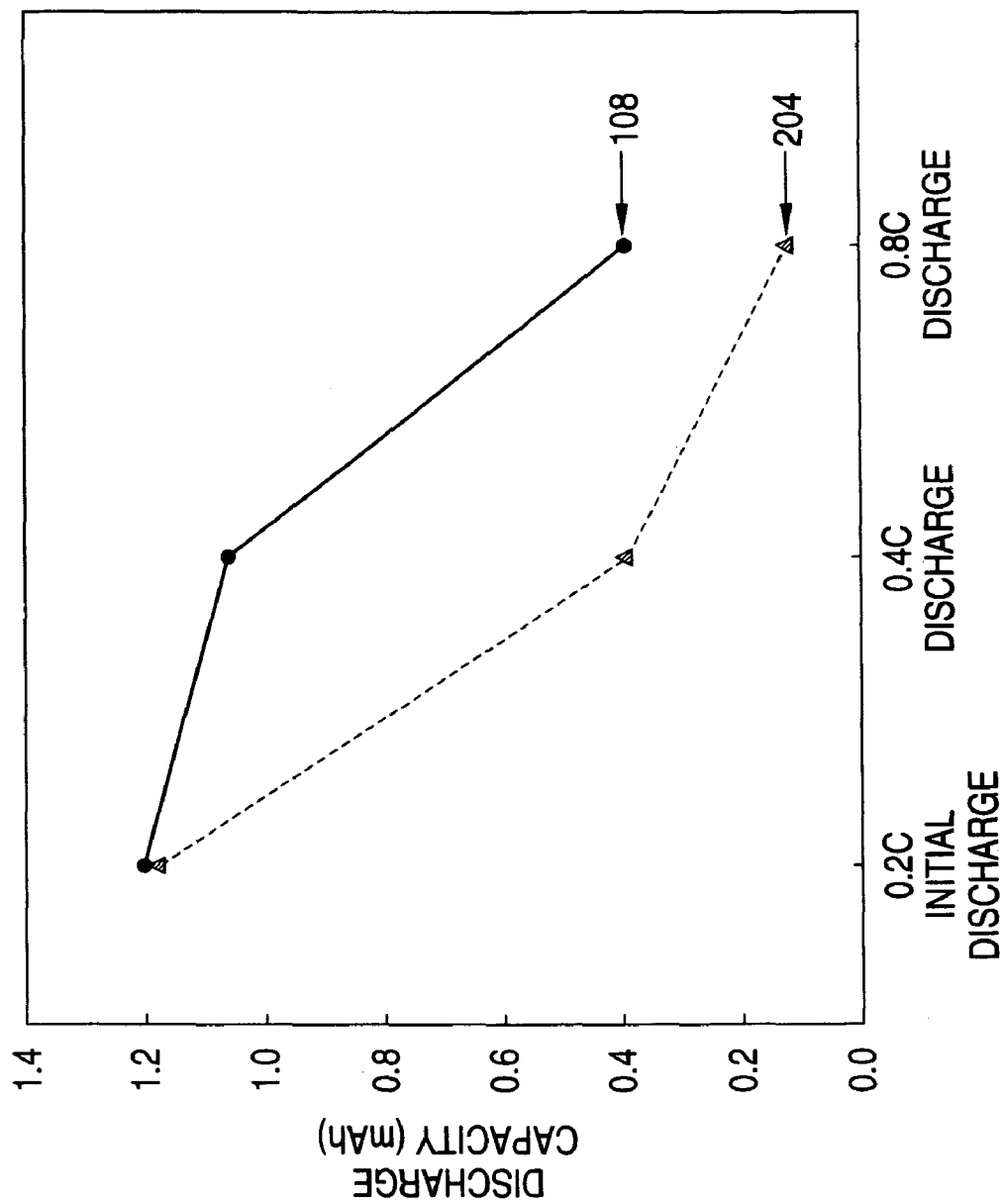
FIG. 3 is a diagram illustrating the output performances of inventive examples and comparative examples.

The non-aqueous electrolyte secondary batteries of Example 8 and Comparative Example 4 thus obtained were each charged with a constant current of 0.25 mA to 2.8 V. After reaching 2.8 V, these batteries were each then charged at a constant voltage of 2.8 V for 8 hours in total. Thereafter, these batteries were discharged to 1.5 V with a constant current of 0.25 mA. Thereafter, these batteries were charged under the same conditions as mentioned above, and then discharged to 1.5 V with 0.5 mA and 1.0 mA. These batteries were each then measured for discharge capacity. The discharge capacity thus determined are shown in FIG. 3. Lines 108 and 204 in FIG. 3 represent discharge capacities of Example 8 and Comparative Example 4, respectively.

Figure 4:
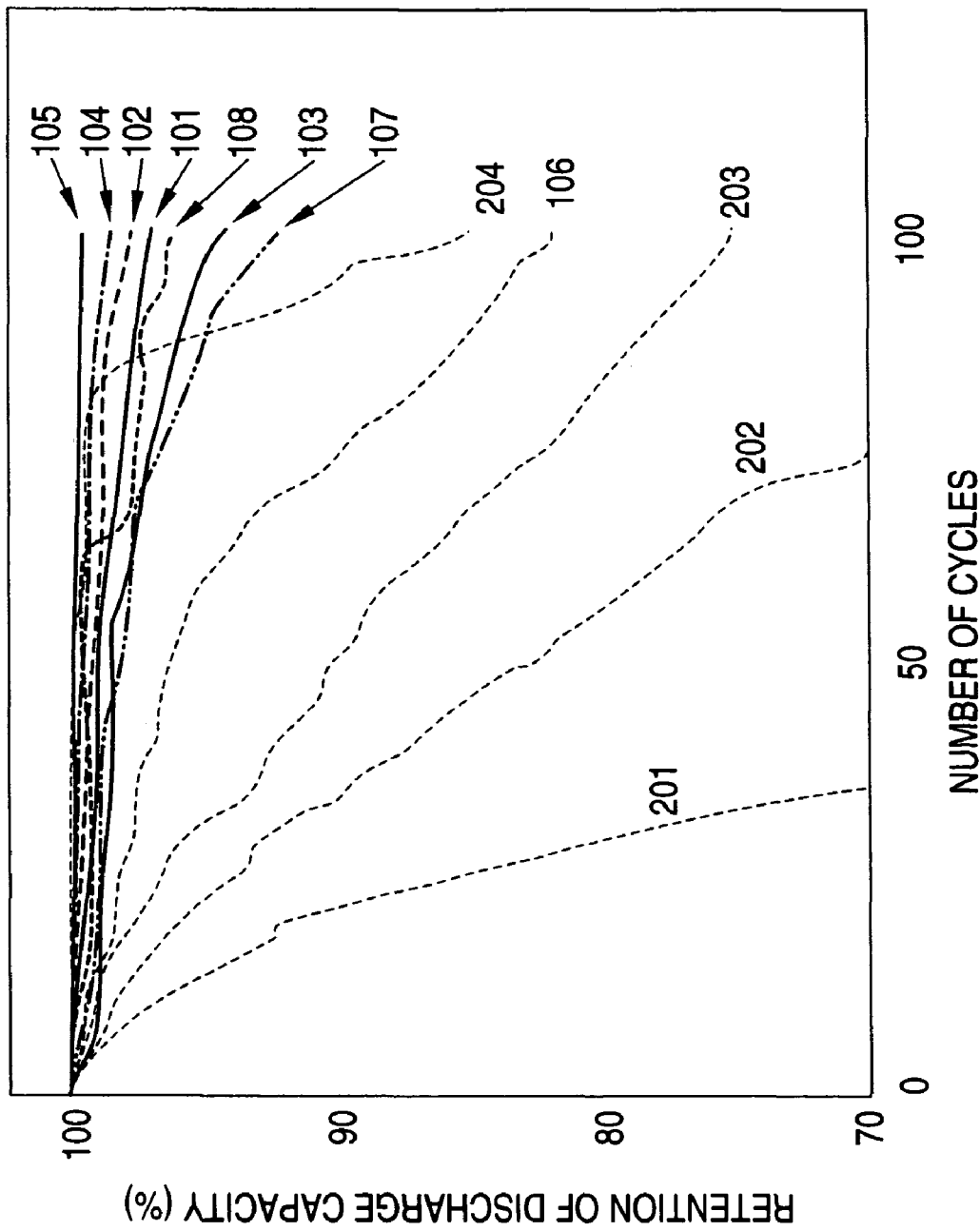
FIG. 4 is a diagram illustrating the cycle performances of inventive examples and comparative examples.

Subsequently, The non-aqueous electrolyte secondary batteries of Examples 1 to 8 and Comparative Examples 1 to 4 were each charged with a constant current of 0.25 mA to 2.8 V. After reaching 2.8V, these batteries were each then charged at a constant voltage of 2.8V for 8 hours in total. Thereafter, these batteries were discharged to 1.5 V with a constant current of 0.25 mA. This charge-discharge cycle was repeatedly conducted 100 times. These batteries were each then examined for change with charge-discharge cycle. The results of change of discharge capacity after cycle determined aforementioned evaluation method are shown in FIG. 4. Lines 101 to 108 in FIG. 4 represent discharge capacities of Examples 1 to 8, respectively, and Lines 201 to 204 in FIG. 4 represent discharge capacities of Comparative Examples 1 to 4, respectively.

As can be seen in FIGS. 2 to 4, the non-aqueous electrolyte secondary batteries of Examples 1 to 7 using tetrafluoroborate anion exhibit higher output performances and higher percent retention of discharge capacity after cycle than those of Comparative Examples 1 to 3, and the non-aqueous electrolyte secondary battery of Example 8 using bis(trifluoromethanesulfonyl)amide anion exhibit higher output performances and higher percent retention of discharge capacity after cycle than those of Comparative Example 4.

While the invention has been particularly shown and described with references to embodiment thereof, it will be understood by those skilled in the art that various changes in form and details may be made therein without departing from the spirit and scope of the invention as defined by the appended claims.

What is claimed is:

1. A non-aqueous electrolyte battery comprising:
   a negative electrode comprising a lithium titanate;
   a positive electrode having a discharge capacity of 1.05 to 1.10 times that of the negative electrode; and
   an electrolyte comprising a lithium salt and a molten salt, the electrolyte having a molar ratio of the lithium salt to the molten salt of from 0.3 to 0.5,
   wherein the molten salt contains an aromatic quaternary ammonium ion.

2. The non-aqueous electrolyte battery according to claim 1, wherein the discharge capacity of the positive electrode is from 1.05 to 1.07 times that of the negative electrode.

3. The non-aqueous electrolyte battery according to claim 1, wherein the negative electrode has a working potential of nobler than 0.5 V with respect to a working potential of lithium metal.

4. The non-aqueous electrolyte battery according to claim 1, wherein the positive electrode comprises a lithium composite oxide containing at least one of a cobalt, a manganese and a nickel.

5. The non-aqueous electrolyte battery according to claim 1, wherein the positive electrode has a charge-discharge potential of 3.8 V or more with respect to a working potential of lithium metal.

6. The non-aqueous electrolyte battery according to claim 1, wherein the lithium salt is at least one of a lithium tetrafluoroborate, a lithium hexafluorophosphate, a lithium bis(trifluoromethane sulfonyl)amide, a lithium dicyanamide, a lithium trifluoromethanesulfonate and a lithium bis(pentafluoroethanesulfonyl)amide.

7. The non-aqueous electrolyte battery according to claim 1, wherein the aromatic quaternary ammonium ion is a cation having an imidazolium structure.

8. The non-aqueous electrolyte battery according to claim 7, wherein the cation having the imidazolium structure is at least one of 1-ethyl-3-methyl-imidazolium, 1-methyl-3-propylimidazolium, 1-methyl-3-propylimidazolium, 1-methyl-3- isopropylimidazolium, 1-butyl-3-methylimidazolium, 1-ethyl-2,3-dimethyl imidazolium and 1-ethyl-3,4-dimethylimidazolium.

* * * * *